Figure 2:
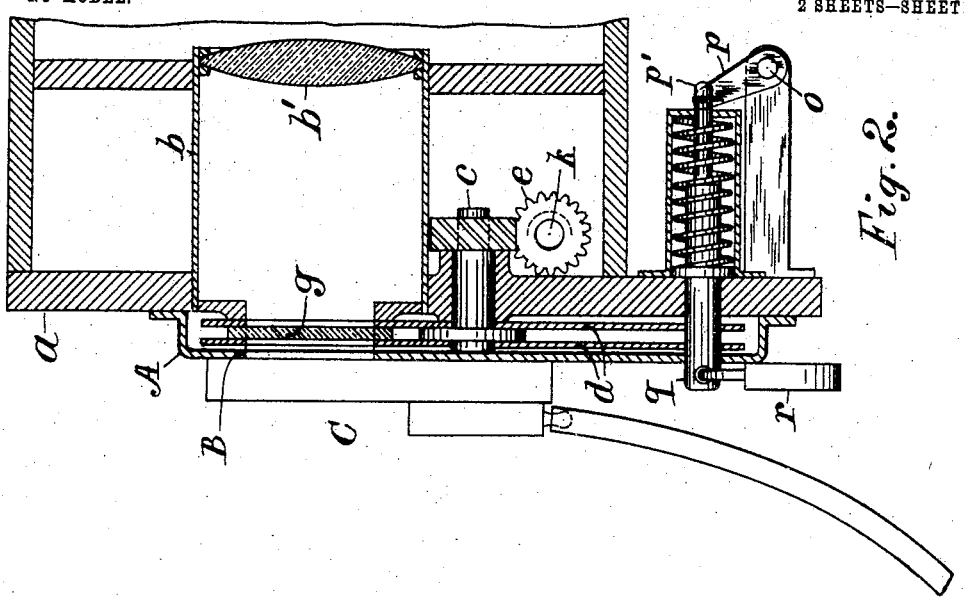

No. 766,389. PATENTED AUG. 2, 1904.
A. G. RUSSELL.
PHOTOGRAPHIC HALF TONE COLOR SCREEN AND CHART.
APPLICATION FILED APR. 29, 1903.
NO MODEL. 2 SHEETS—SHEET 1.

Attest:
L. Lee
Arthur J. Heaton

Inventor.
Arthur G. Russell, per
Thomas S. Crane, Atty.

No. 766,389. PATENTED AUG. 2, 1904.
A. G. RUSSELL.
PHOTOGRAPHIC HALF TONE COLOR SCREEN AND CHART.
APPLICATION FILED APR. 29, 1903.
NO MODEL. 2 SHEETS—SHEET 2.

Attest:
L. Lee
Arthur T. Heaton.

Inventor.
Arthur G. Russell, per
Thomas S. Crane, Atty.

No. 766,389.

Patented August 2, 1904.

UNITED STATES PATENT OFFICE.

ARTHUR G. RUSSELL, OF LOS ANGELES, CALIFORNIA.

PHOTOGRAPHIC HALF-TONE COLOR SCREEN AND CHART.

SPECIFICATION forming part of Letters Patent No. 766,389, dated August 2, 1904.

Application filed April 29, 1903. Serial No. 154,801. (No model.)

*To all whom it may concern:*

Be it known that I, ARTHUR G. RUSSELL, a citizen of the United States, residing at 923 West Thirty-sixth street, Los Angeles, county of Los Angeles, State of California, have invented certain new and useful Improvements in Photographic Half-Tone Color Screens and Charts, fully described and represented in the following specification and the accompanying drawings, forming a part of the same.

The present invention relates to the making of photographic negatives for the production of photo-engraved plates in the art of three-color printing. It is common in preparing the etched plates for such color-printing to first make three negatives of the same object which are caused to differ from one another in making the successive negatives by interposing between the camera and the object so-called "color-screens" of the three primary colors—red, blue, and yellow. The negative taken behind the red screen differs from that taken behind the blue screen or the yellow screen, and the plate prepared from such a negative when suitably etched is adapted to print with the red ink, while the plates prepared from the other negatives are adapted, respectively, to print with blue and yellow ink, the three colors being printed one over the other in a manner well known to produce a composite picture in its natural colors of the object photographed.

In the present invention I employ a so-called "color-chart" comprising a tablet bearing spaces of the three primary colors, which tablet is placed in the foreground of the object when photographed with the respective color-screens. The red, blue, and yellow spaces upon the color-chart may be marked 1 2 3 or may be arranged in a definite order, as blue and yellow at the ends, with the red in the middle, with a star or other index-mark upon the blue or yellow space, so that the impression upon the negative will always indicate which space upon the chart is the blue.

In the drawings the color-spaces upon the color-chart are shown with the capital letters R B Y applied at the tops of the three spaces to designate the red, blue, and yellow color of such spaces. These letters serve as symbols in the impressions made upon the negative to indicate the colors represented thereon. As the disks which carry the color-screens are wholly inclosed in the casing A, gearing is required to turn the disks, which is provided as follows: Each negative thus exhibits not only the impression of the object, but an impression of the three primary colors on the color-chart as transmitted by the respective color-screens with which the three negatives are taken, and such impression of the color-chart upon each negative exhibits the separation of the three colors on the several negatives, which separation is so readily distinguished that it indicates at once to any one using the device which color-screen was used in taking each negative, and thus serves as a guide in the succeeding operations with the negatives, resulting positives, or prints which may be produced therefrom in the three-color process of photo-engraving and printing.

The symbols upon the color-chart serve to define the impression of the different colors upon each of the negatives, and in order to secure the impression of the color-chart simultaneously with the impression of the object which is photographed the chart is suitably proportioned to place adjacent to the object, so that it may appear on the margin of the negative in an inconspicuous position.

In the present invention I provide a rotatable holding-disk in which the color-screens are permanently fixed and mount the same transverse to the lens-tube of the camera and provide it with mechanism for adjusting the screens successively in front of the lens and for locking the disk when thus adjusted. The bolt for effecting such locking is preferably a spring-bolt adapted to engage the disk whenever it is turned with one of the screens in the proper adjustment, and the bolt may be so constructed that a key is required to release it, by which means the unauthorized use of the color-screens is prevented.

The invention will be understood by reference to the annexed drawings, in which—

Figure 1:
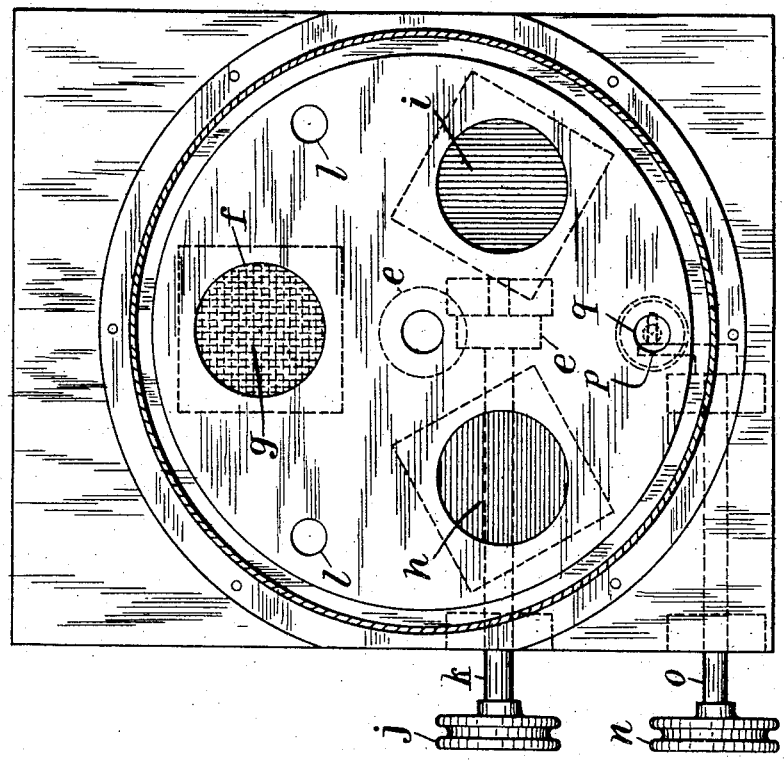

Figure 1 is a front view of a camera provided with the color-screen holder, the cover which incloses the holder being removed.

Figure 4:
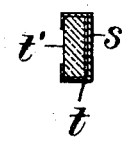
Figure 3:
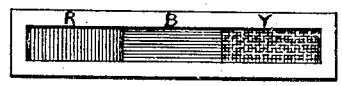
Figure 5:
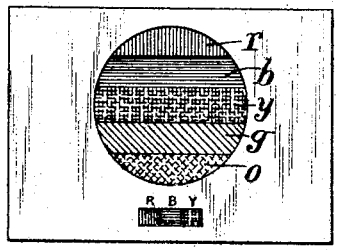
Figure 6:
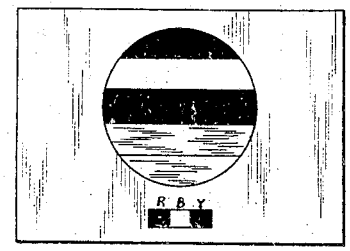
Figure 7:
Figure 8:
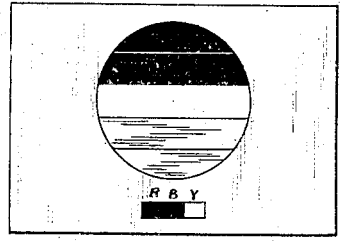

Fig. 2 is a vertical section on the center line of the same. Fig. 3 is a front view of the color-chart; Fig. 4, a cross-section of the same; Fig. 5, an elevation of an object with the color-chart arranged in readiness to photograph for the three required negatives. Fig. 6 is a view of the negative of such object and chart photographed with the red color-screen, and Figs. 7 and 8 show the negative-photograph with blue and yellow screens.

In the drawings the camera-chamber and negative are not shown, as their nature is well understood; but the front of the camera is represented in Figs. 1 and 2 with the lens-tube.

$a$ designates the camera-front, $b$ the lens-tube, and $b'$ the lens.

$c$ designates a spindle in the camera-front, with disks $d$ attached thereto and formed with three equidistant apertures $f$. The glass plates forming the color-screens $g$, $h$, and $i$ are secured between the disks over such apertures, and the spindle $c$ is so situated that the disks may be successively alined with the center of the lens-tube.

As the guide box or casing A is attached to the front $a$ to inclose the disks and has an aperture B in line with the lens-tube for exposing the negative, a conventional representation of a shutter-fixture C is shown over the aperture $b$ to make such exposure when desired.

A hand-wheel $j$ and shaft $k$ are connected by gears $e$ with the spindle $c$ for turning the disk to adjust the color-screens. Holes $l$ are formed in the disk, and a spring-bolt $m$ is fitted to the front $a$ and adapted to slip into such holes when each of the screens is successively alined with the lens. A hand-wheel $n$ and shaft $o$ are connected by a crank $p$ with a rod $p'$, attached to the bolt $m$, to retract the same from the disk when it is desired to adjust the disk. A hole $q$ is shown in the bolt $m$ where it projects through the casing or box A, and a padlock $r$ is shown applied to such hole to prevent the retraction of the bolt until the padlock is removed. The use of a padlock with a key to open the same thus serves to secure the disk from unauthorized rotation, and any other form of lock-bolt would obviously be an equivalent.

"*Color-chart.*"—The color-chart may consist of any tablet bearing spaces properly tinted with the three primary colors and the several color-spaces marked, respectively, with different symbols, which appear in connection with the impression of such colors upon the negative when taken. In Fig. 3 of the drawings the chart is shown formed with a back piece $s$, paper $t$, bearing the colors, and a glass cover $t'$, the glass cover protecting the colored spaces from injury by soiling or abrasion. The margin of the glass cover is shown provided over the red space with the letter R at the left end of the chart, over the blue space in the middle of the chart with the letter B, and over the yellow space at the right-hand end of the chart with the letter Y, these letters forming the symbols to designate the respective impressions which these spaces make upon the negative, as shown in Figs. 5 to 8, inclusive. In Fig. 5 the object is represented as a circle with five bands of color extended across the same and shaded in a conventional manner to represent red where a letter $r$ is applied, blue where the letter $b$ is applied, yellow where the letter $y$ is applied, green where the letter $g$ is applied, and orange where the letter $o$ is applied. The screen in Fig. 3 is also shaded conventionally in three places, (lettered, respectively, $r$, $b$, and $y$,) and such screen is shown upon a smaller scale below the object in Fig. 5. Fig. 6 shows the appearance of the negative when the object and color-chart are photographed through the red screen, the red and yellow appearing as black and the blue appearing as white and the green and orange appearing as gray or semitransparent upon the negative. Fig. 7 shows the appearance of the negative with the object and color-chart photographed through the yellow screen, and Fig. 8 the negative with the object and chart photographed through the blue screen. These negatives show similarly variations in the bands upon the photograph of the object, and the color-chart in each of the negatives shows variations produced by the several screens.

The color-chart on the negative in Fig. 6 shows the blue portion of the chart white and the red and yellow portions black.

The color-chart on the negative in Fig. 7 shows the red portion of the chart white and the blue and yellow portions black.

The color-chart on the negative in Fig. 8 shows the yellow portion of the chart white and the red and blue portions black.

The letters R, B, and Y, which appear upon the chart in Fig. 3, also appear upon the negatives, so that the operator can instantly tell by the color-chart upon the negative which screen has been used in taking such negative. When the positives are made from such negatives, the representation of the color-chart is of course reversed, but the letters remain, and the operator can thus tell through which screen the original negative was taken from which the positive is produced.

*Operation of the devices.*—The operation of making the three-color negatives by my invention is as follows: The color-chart is arranged, as shown in Fig. 5, in the foreground of the object to be photographed, and one of the negatives is inserted in the camera and the object focused. The spring-bolt is then retracted by the hand-wheel $n$, and the disk $d$, by means of the hand-wheel $j$, is partially rotated and the hand-wheel $n$ released to let the bolt press upon the disk. When any one of the color-screens is turned in line with the lens, the spring-bolt enters the hole in the disk and arrests the same and holds the color-screen in such position. The negative is then taken through such color-screen and a fresh plate inserted in the camera, the disk shifted to bring the next screen in line with the lens, and another negative is taken through the succeeding color-screen, and, finally, a third negative is taken through the third color-screen. The impression of the color-chart is different upon each of the negatives and shows the separation of the colors in such a manner that the negatives can be readily distinguished from one another without any other mark applied to the negative. When the positives are made and also the prints from the negatives, the impression of the color-chart still persists and operates as a guide in each step of the process.

In working the three-color process the half-tone negatives exhibit the same variations as the original negatives and the etched plates are the same as the positive, thereby making the colors print solid. The impression of the color-chart upon the etched plates would be cut off when finished; but the picture printed by each of the plates would still correspond mathematically with the separation of color exhibited upon the chart and negatives.

The use of the color-chart is thus of great value to the operator in making and handling the negatives and positives in three-color photography, and the use of the apparatus also greatly facilitates the taking of negatives by the three-color process.

Having thus set forth the nature of the invention, what is claimed herein is—

1. The apparatus for conjoint use in photographing three-color negatives, comprising a camera, a set of three "color-screens" and a three-color chart of suitable size to photograph with the object, such chart having spaces of the three primary colors marked with different symbols adapted to indicate the colors symbolically in the negative taken from such color-chart and object, the whole arranged and operated substantially as herein set forth.

2. A color-chart for use with color-screens in making negatives for three-color printing, comprising a suitable tablet bearing three color-spaces corresponding with the colors of the "color-screens," which spaces have different symbols to indicate the colors symbolically in the negatives taken from such color-chart.

3. In an apparatus for making three-color negatives, the combination, with the camera-front and the lens-tube fixed therein, of the spindle $c$ having the disk $d$ parallel with the front and carrying the three color-screens, the box or casing A wholly inclosing the disk and color-screens, and provided with the usual aperture and shutter, and the hand-wheel $j$ with gearing connecting the same to the spindle $c$ for turning the disk to adjust the "color-screens."

4. In an apparatus for making three-color negatives, the combination, with the camera lens and tube, of a rotatable disk carrying the three "color-screens" transverse to the lens-tube, means for rotating the holder to bring the "color-screens" successively in line with the lens-tube, and means for locking the disk when thus adjusted.

5. In an apparatus for making three-color negatives, the combination, with the camera lens and tube, of a rotatable disk carrying the three "color-screens" transverse to the lens-tube, a spring-bolt set transversely to the rotatable holder, the holder being provided with holes to engage such bolt when the screens are alined with the lens-tube, and means for withdrawing the bolt from the holes and turning the disk to adjust the screens.

6. In an apparatus for making three-color negatives, the combination, with the camera-front and the lens-tube fixed therein, of the spindle $c$ having the disk $d$ parallel with the "front" and carrying the three "color-screens," the box A inclosing the disk and provided with the usual aperture and shutter, a lock-bolt fitted to the "front" to engage the disk, and handpieces adapted to rotate the disk-spindle and to operate the lock, substantially as herein set forth.

7. In an apparatus for making three-color negatives, the combination, with the camera lens and tube, of a rotatable disk carrying the three "color-screens" transverse to the lens-tube, means for rotating the holder to bring the "color-screens" successively in line with the lens-tube, a bolt for securing the disk when adjusted, and a lock provided with a key and arranged and operated to fasten the bolt to prevent the turning of the disk.

8. In an apparatus for making three-color negatives, the combination, with the "camera-front" and the lens-tube fixed therein, of the disk carrying the "color-screens" transverse to the lens-tube, a spring-bolt arranged and operated to engage the disk automatically when each of the screens is in line with the lens-tube, and means provided with a key for releasing such spring-bolt to permit the turning of the disk.

In testimony whereof I have hereunto set my hand in the presence of two subscribing witnesses.

ARTHUR G. RUSSELL.

Witnesses:
FLORENCE MAYBELLE CASE,
FLORA C. RAYMORE.